United States Patent
Lin

(10) Patent No.: US 9,928,177 B2
(45) Date of Patent: Mar. 27, 2018

(54) MANAGING METHOD FOR CACHE MEMORY OF SOLID STATE DRIVE

(71) Applicants: LITE-ON TECHNOLOGY CORPORATION, Taipei (TW); Lite-On Electronics (Guangzhou) Limited, Guangzhou (CN)

(72) Inventor: Sin-Yu Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 31 days.

(21) Appl. No.: 14/989,129

(22) Filed: Jan. 6, 2016

(65) Prior Publication Data

US 2016/0117251 A1 Apr. 28, 2016

Related U.S. Application Data

(63) Continuation-in-part of application No. 14/142,107, filed on Dec. 27, 2013, now abandoned.

(30) Foreign Application Priority Data

Aug. 21, 2013 (CN) .......................... 2013 1 0365417

(51) Int. Cl.
*G06F 12/00* (2006.01)
*G06F 13/00* (2006.01)
(Continued)

(52) U.S. Cl.
CPC ........ *G06F 12/0871* (2013.01); *G06F 3/0613* (2013.01); *G06F 3/0656* (2013.01);
(Continued)

(58) Field of Classification Search
CPC ...... G06F 3/061; G06F 3/0611; G06F 3/0613; G06F 3/0631; G06F 3/0638; G06F 3/064;
(Continued)

(56) References Cited

U.S. PATENT DOCUMENTS 7,987,315 B2 * 7/2011 Lee ........................ G06F 3/0616
711/103
8,504,784 B2 * 8/2013 Traister ............... G06F 12/0246
711/103

(Continued)

OTHER PUBLICATIONS

Analytic Models of SSD Write Performance; Desnoyers, Peter; ACM Transactions on Storage, col. 10, iss. 2, article No. 8; Mar. 2014 (25 pages) (Year: 2014).*

(Continued)

*Primary Examiner* — Daniel C Chappell
(74) *Attorney, Agent, or Firm* — WPAT, PC

(57) ABSTRACT

A managing method for a cache memory of a solid state drive includes the following steps. When the solid state drive decides to perform a garbage collection, a storing space of the cache memory is divided into plural storing portions according to at least one of the command type of an access command, access data size of the access command and the drive free space. A first storing portion of the cache memory is set as a buffering unit for a garbage collecting purpose. A second storing portion of the cache memory is set as a buffering unit for a writing purpose.

16 Claims, 6 Drawing Sheets

(51) Int. Cl.
*G06F 13/28* (2006.01)
*G06F 12/0871* (2016.01)
*G06F 12/0873* (2016.01)
*G06F 3/06* (2006.01)
*G06F 12/02* (2006.01)

(52) U.S. Cl.
CPC ........ *G06F 3/0679* (2013.01); *G06F 12/0246* (2013.01); *G06F 12/0873* (2013.01); *G06F 2212/1016* (2013.01); *G06F 2212/214* (2013.01); *G06F 2212/282* (2013.01); *G06F 2212/313* (2013.01); *G06F 2212/608* (2013.01); *G06F 2212/7203* (2013.01); *G06F 2212/7205* (2013.01)

(58) Field of Classification Search
CPC .... G06F 3/0644; G06F 3/0646; G06F 3/0656; G06F 3/0668; G06F 3/0671; G06F 3/0673; G06F 3/0679; G06F 5/06; G06F 5/065; G06F 5/10; G06F 9/3814; G06F 9/50; G06F 9/5005; G06F 9/5011; G06F 9/5016; G06F 9/5061; G06F 9/5077; G06F 12/02; G06F 12/0223; G06F 12/023; G06F 12/0238; G06F 12/0246; G06F 12/0253; G06F 12/0261; G06F 12/0269; G06F 12/0276; G06F 12/0844; G06F 12/0846; G06F 12/0848; G06F 12/0871; G06F 12/0873; G06F 12/08; G06F 12/73; G06F 2210/00; G06F 2210/10; G06F 2210/1016; G06F 2210/1021; G06F 2210/1024; G06F 2212/1016; G06F 2212/214; G06F 2212/28; G06F 2212/281; G06F 2212/282; G06F 2212/313; G06F 2212/608; G06F 2212/72; G06F 2212/7203; G06F 2212/7204; G06F 2212/7205

See application file for complete search history.

(56) References Cited

U.S. PATENT DOCUMENTS

| | | | | |
|---|---|---|---|---|
| 8,639,883 | B2* | 1/2014 | Belluomini | G06F 12/0804 711/129 |
| 8,745,309 | B2* | 6/2014 | Jung | G06F 12/0246 711/103 |
| 8,880,775 | B2* | 11/2014 | Stefanus | G06F 12/0246 711/103 |
| 9,003,159 | B2* | 4/2015 | Deshkar | G06F 12/0246 707/813 |
| 9,135,181 | B2* | 9/2015 | Eleftheriou | G06F 12/0888 |
| 9,400,603 | B2* | 7/2016 | Tressler | G06F 3/0604 |
| 9,547,589 | B2* | 1/2017 | Yu | G11C 16/349 |
| 2009/0235015 | A1* | 9/2009 | Hatsuda | G06F 12/0866 711/118 |
| 2011/0055458 | A1* | 3/2011 | Kuehne | G06F 12/0246 711/103 |
| 2011/0145473 | A1* | 6/2011 | Maheshwari | G06F 12/0866 711/103 |
| 2011/0258391 | A1* | 10/2011 | Atkisson | G06F 11/108 711/118 |
| 2012/0210041 | A1* | 8/2012 | Flynn | G06F 1/183 711/3 |
| 2012/0221774 | A1* | 8/2012 | Atkisson | G06F 12/0802 711/103 |
| 2013/0198453 | A1* | 8/2013 | Kim | G06F 12/0871 711/118 |
| 2014/0095775 | A1* | 4/2014 | Talagala | G06F 12/0866 711/103 |
| 2014/0240335 | A1* | 8/2014 | Hu | G06F 12/0802 345/543 |

OTHER PUBLICATIONS

An aggressive worn-out flash block management scheme to alleviate SSD performance degradation; Huang et al; Proceedings of the Ninth European Conference on Computer Systems, article No. 22; Apr. 14-16, 2014 (14 pages) (Year: 2014).*
Container Marking: Combining Data Placement, Garbage Collection and Wear Levelling for Flash; Hu et al; 2011 IEEE 19th International Symposium on Modeling, Analysis & Simulation of Computer and Telecommunication Systems; Jul. 25-27, 2011; pp. 237-247 (11 pages) (Year: 2011).*
Adaptive policies for balancing performance and lifetime of mixed SSD arrays through workload sampling; Moon et al; 32nd Symposium on Mass Storage Systems and Technologies; May 2-6, 2016 (13 pages) (Year: 2016).*

* cited by examiner

MANAGING METHOD FOR CACHE MEMORY OF SOLID STATE DRIVE

This is a continuation-in-part application of co-pending U.S. application Ser. No. 14/142,107, filed on Dec. 27, 2013, which claims the benefit of People's Republic of China Application Serial No. 201310365417.3, filed Aug. 21, 2013, the contents of which are incorporated herein by reference.

FIELD OF THE INVENTION

The present invention relates to a controlling method for a solid state drive, and more particularly to a managing method for a cache memory of a solid state drive.

BACKGROUND OF THE INVENTION

FIG. 1 is a schematic functional block diagram illustrating a conventional storage device. As shown in FIG. 1, the storage device 10 is in communication with a host 12 in order for receiving a read command or a write command from the host 12. For example, the host 12 is a computer host, and the storage device 10 is a hard disc drive or an optical drive.

The storage device 10 comprises a controlling unit 101, a cache memory 103, and a storage element 105. The controlling unit 101 is in communication with the host 12 through an external bus 20. Consequently, commands and data can be exchanged between the controlling unit 101 and the host 12. According to a command from the host, the controlling unit 101 may access the data of the storage element 105. Moreover, the cache memory 103 is connected with the controlling unit 101 in order for temporarily storing the write data from the host 12 or the read data requested by the host 12.

Generally, the external bus 20 may be a USB bus, an IEEE 1394 bus, an SATA bus, or the like. The storage element 105 is an optical disc or a magnetic disc.

As is well known, the cache memory 103 is used for temporarily storing the write data from the host 12 or the read data requested by the host 12. For example, in case that the host 12 issues the write command and the corresponding write data to the storage device 10, the write command and the corresponding write data are temporarily stored into the cache memory 103 by the controlling unit 101, and then the write data is processed (e.g. generation of ECC code) and stored into the storage element 105 by the controlling unit 101. Whereas, in case that the host 12 issues the read command to the storage device 10, the read data from the storage element 105 is temporarily stored into the cache memory 103 by the controlling unit 101, and then the read data is transmitted to the host 12 by the controlling unit 101.

From the above discussions, the cache memory 103 is used for temporarily storing the write data (i.e. for a writing purpose) when the host 12 issues the write command; and the cache memory 103 is used for temporarily storing the read data (i.e. for a reading purpose) when the host 12 issues the read command.

Recently, a novel storage device such as a solid state drive (SSD) is introduced into the market and becomes more popular. The solid state drive has the tendency to gradually replace the hard disc drive or the optical drive.

Generally, the solid state drive is a storage device that uses a NAND-based flash memory as a storage element. The NAND-based flash memory is a non-volatile memory. After a data is written to the flash memory, if the systematic power is turned off, the data is still retained in the solid state drive.

Since the storage element of the solid state drive is distinguished, the cache memory of the solid state drive should have a specially-designed managing mechanism in order to enhance the operating efficiency of the solid state drive.

SUMMARY OF THE INVENTION

A first embodiment of the present invention provides a managing method for a cache memory of a solid state drive. The managing method includes the following steps. When the solid state drive decides to perform a garbage collection, a storing space of the cache memory is divided into plural storing portions according to at least one of a command type of an access command, access data size of the access command and drive free space of the solid state drive. A first storing portion of the cache memory is set as a buffering unit for a garbage collecting purpose. A second storing portion of the cache memory is set as a buffering unit for a writing purpose.

A second embodiment of the present invention provides a managing method for a cache memory of a solid state drive. The managing method includes the following steps. In a step (a), the cache memory is designed for a writing purpose and/or a reading purpose according to an access command before the solid state drive performs a garbage collection. In a step (b), a first storing portion of the cache memory is set as a buffering unit for a garbage collecting purpose and a second storing portion of the cache memory is set as a buffering unit for the writing purpose according to at least one of a command type of the access command, access data size of the access command and drive free space of the solid state drive when the solid state drive decides to perform the garbage collection. In a step (c), the step (a) is repeatedly done after the garbage collection is completed by the solid state drive.

A third embodiment of the present invention provides a solid state drive in communication with a host. The solid state drive includes a controlling unit, a flash memory, and a cache memory. The controlling unit is in communication with the host. The controlling unit receives an access command from the host and determines at least one of a command type of the access command, access data size of the access command and drive free space of the solid state drive. The flash memory is connected to the controlling unit. The cache memory is connected to the controlling unit. When the controlling unit decides to perform a garbage collection, a first storing portion of the cache memory is set as a buffering unit for a garbage collecting purpose, and a second storing portion of the cache memory is set as a buffering unit for a writing purpose.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
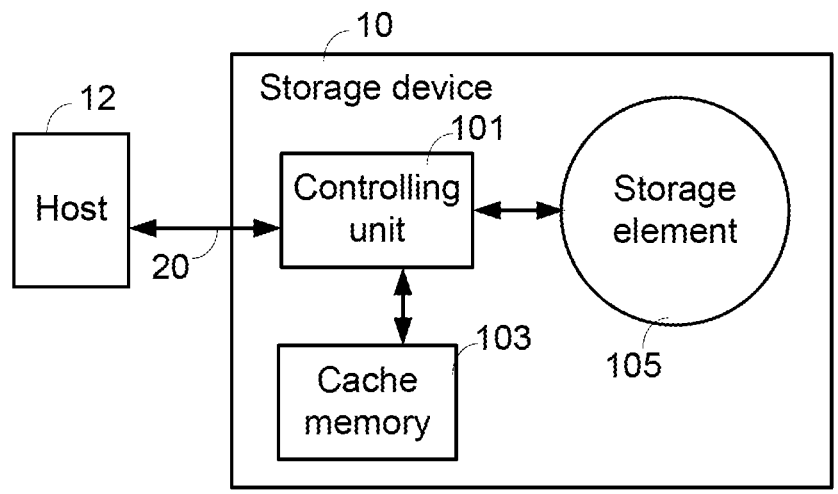
FIG. 1 (prior art) is a schematic functional block diagram illustrating a conventional storage device.
Figure 2:
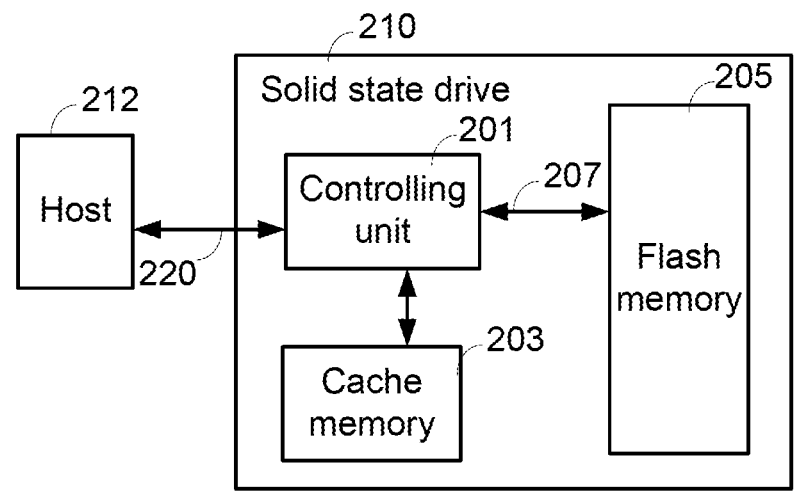
FIG. 2 is a schematic functional block diagram illustrating a solid state drive according to an embodiment of the present invention.

FIG. 2 is a schematic functional block diagram illustrating a solid state drive according to an embodiment of the present invention. As shown in FIG. 2, the solid state drive 210 comprises a controlling unit 201, a cache memory 203, and a flash memory 205. The flash memory 205 is accessible by the controlling unit 201 through an internal bus 207. The controlling unit 201 is in communication with the host 212 through an external bus 220. Consequently, commands and data can be exchanged between the controlling unit 201 and the host 22. Moreover, the cache memory 203 is connected with the controlling unit 201 in order for temporarily storing the write data from the host 22 or the read data requested by the host 22. Generally, the external bus 220 may be a USB bus, an IEEE 1394 bus, an SATA bus, or the like.

Since the material of the solid state drive 210 is different from the material of the storage element of the hard disc drive or the optical drive, the method of storing data is distinguished.

Generally, the flash memory 205 of the solid state drive 210 comprises plural blocks. Each block comprises plural pages (or sectors), for example 64 pages. Each page is typically 4K bytes in size. Due to the inherent properties of the flash memory 205, at least one page is written at a time during the writing operation, but a block is erased during the erasing operation.

In the flash memory 205, the block without any stored data is referred as a free block, and the block with the stored data is referred as a used block. In case that the data of a used block are all invalid data, the used block may be erased as a free block. Consequently, the free block can be used to store data again.

However, after the flash memory 205 has been accessed for a long time, each block of the flash memory 205 may contain some valid data and some invalid data. As long as the used block contains the valid data, the used block fails to be erased as the free block. Since the space of the flash memory 205 is occupied by a great number of invalid data, the writable space of the flash memory 205 is gradually reduced.

As the number of used blocks in the flash memory 205 gradually increases and the number of free blocks in the flash memory 205 gradually decreases, it is necessary to perform a garbage collection. Generally, when the number of free blocks in the flash memory 205 decreases to a threshold number, the garbage collection is started by the controlling unit 201. After the garbage collection is performed, the storing space of the invalid data in the used blocks can be released. Consequently, the write data inputted by the host 212 can be continuously stored into the flash memory 205.

Figure 3:
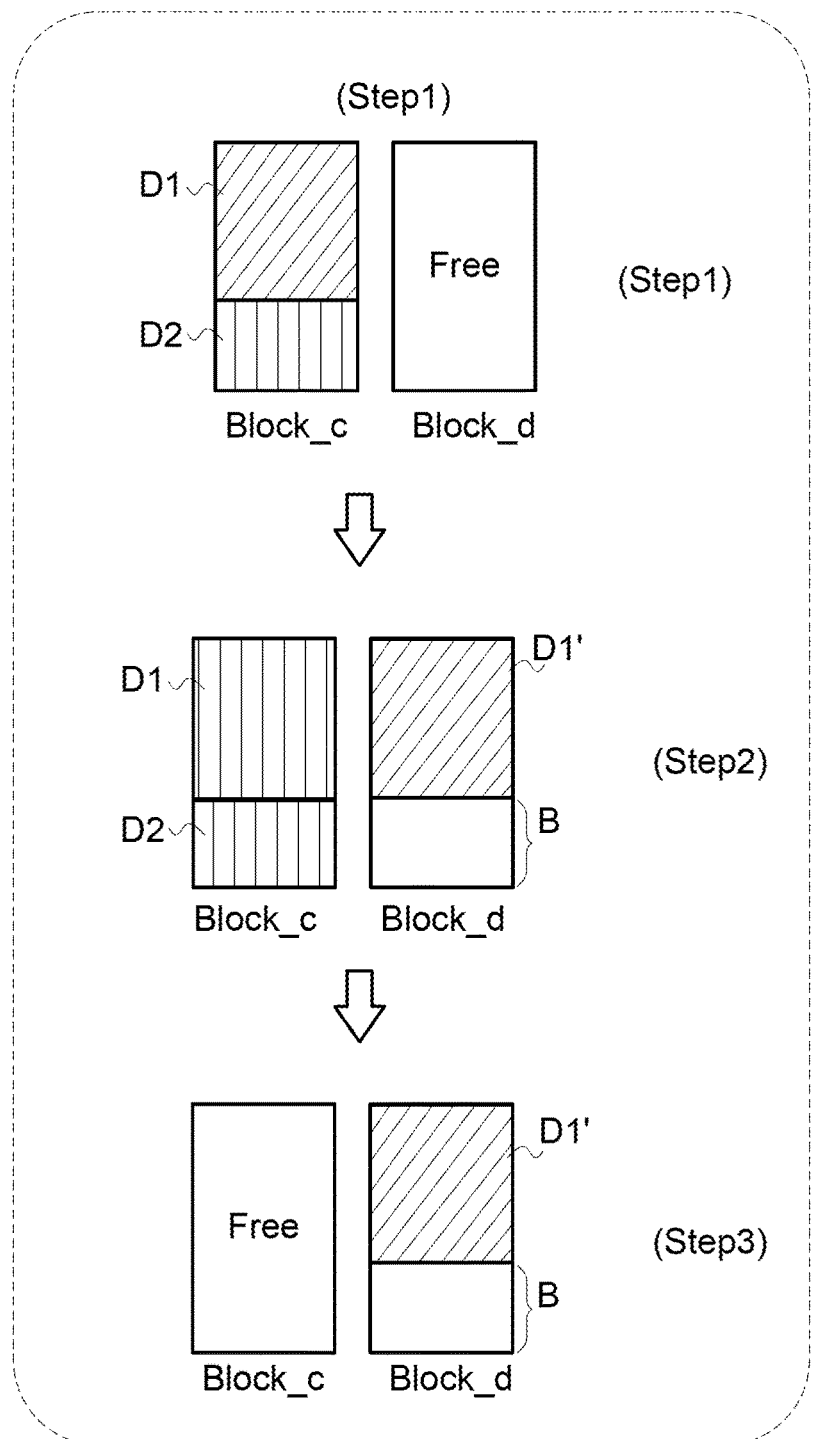
FIG. 3 schematically illustrates a process of performing a garbage collection.

FIG. 3 schematically illustrates a process of performing a garbage collection. As shown in FIG. 3, the data D1 of the used block c (Block_c) are valid data, the data D2 of the used block c (Block_c) are invalid data, and the block d (Block_d) is a free block (Step 1). After the controlling block 201 searches all blocks of the flash memory 205, the controlling block 201 may decide to start the garbage collection on the used block c (Block_c). While the garbage collection is performed on the used block c (Block_c) by the controlling unit 201 (Step 2), the valid data D1 of the used block c (Block_c) are firstly moved to the free block d (Block_d) and refreshed as the valid data D1'. After the valid data D1' is written into the free block d (Block_d), the free block d (Block_d) becomes another used block d (Block_d). Then, all data in the used block c (Block_c) are set as invalid data. Afterwards, in the step 3, the used block c (Block_c) is erased as a new free block c (Block_c). Meanwhile, one garbage collection is completed.

In other words, after the garbage collection is performed, the block c (Block_c) becomes a new free block. Moreover, the used block d (Block_d) still has other free space B for storing data. That is, after the garbage collection is performed, the free space B is a released space for allowing the host 212 to continuously store data. The size of the free space B is smaller than the size of one free block.

In the step 2 of the above process of performing the garbage collection, the valid data D1 of the used block c (Block_c) is written to the free block d (Block_d) and refreshed as the valid data D1'. In this step, the valid data D1 of the used block c (Block_c) is temporarily stored into the cache memory 203 by the controlling unit 201, then the valid data D1 is read from the cache memory 203 by the controlling unit 201, and finally the valid data D1 is written to the free block d (Block_d) and refreshed as the valid data D1'.

From the above discussions, the cache memory 203 of the solid state drive 210 is used for temporarily storing the write data (i.e. for a writing purpose), temporarily storing the read data (i.e. for a reading purpose), or temporarily storing the moved data from the flash memory 205 (i.e. for a garbage collecting purpose).

Figure 4:
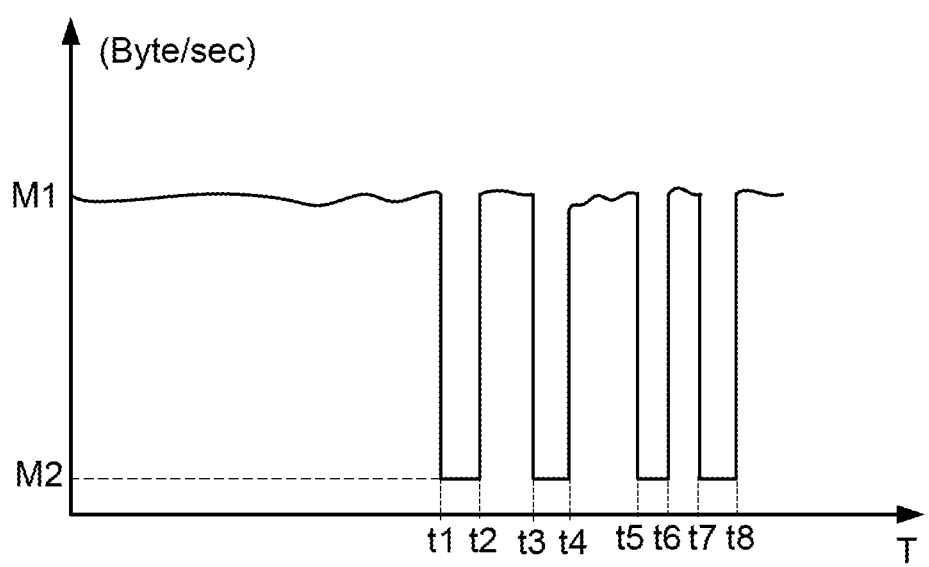
FIG. 4 schematically illustrates the variation of the writing speed of writing data into the solid state drive according to a write command while performing the garbage collection.

FIG. 4 schematically illustrates the variation of the writing speed of writing data into the solid state drive according to a write command while performing the garbage collection. When a write command is executed by the solid state drive 210, the cache memory 203 is used for temporarily storing the write data (i.e. for a writing purpose). Under this circumstance, the writing speed is maintained at the highest speed M1. The highest speed M1 is determined according to the capacity of the cache memory 203 and the operating speed of the controlling unit 201.

However, at the time point t1, the number of free blocks in the flash memory 205 decreases to a threshold number, and thus the garbage collection is started by the controlling unit 201. Moreover, at the time point t1, the controlling unit 201 may stop executing the write command from the host 212 temporarily. In other words, the write data inputted by the host 212 cannot be continuously stored into the flash memory 205.

From the time point t1 to the time point t2, the garbage collection is being performed by the controlling unit 201. Under this circumstance, the cache memory 203 is used for temporarily storing the moved data from the flash memory 205 (i.e. for a garbage collecting purpose). Consequently, the writing speed of the solid state drive 210 drops down to M2 (e.g. 0 Byte/sec).

At the time point t2, the garbage collection is completed, and thus a storing space is released. Consequently, the write command is continuously executed by the controlling unit 201. From the time point t2 to the time point t3, the cache memory 203 is used for temporarily storing the write data (i.e. for a writing purpose). Consequently, the writing peed of the writing speed of the solid state drive 210 rises to the highest speed M1 again.

Similarly, from the time point t3 to the time point t4, from the time point t5 to the time point t6 and from the time point t7 to the time point t8, the garbage collection is being performed by the controlling unit 201. Under this circumstance, the writing speed of the solid state drive 210 drops down to M2 (e.g. 0 Byte/sec) again. Similarly, when the write command is continuously executed by the controlling unit 201, the writing peed of the writing speed of the solid state drive 210 rises to the highest speed M1 again.

From the above discussions, if the controlling unit 201 of the solid state drive 210 executes the write command while performing the garbage collection, the writing speed is intermittent. Under this circumstance, the user feels that it takes a long time for the solid state drive 210 to execute the write command. In other words, the performance of the solid state drive 210 in unit time abruptly decreases.

Similarly, if the controlling unit 201 of the solid state drive 210 executes the read command while performing the garbage collection, the reading speed is also intermittent. In other words, the performance of the solid state drive 210 in unit time abruptly decreases.

Figure 5A:
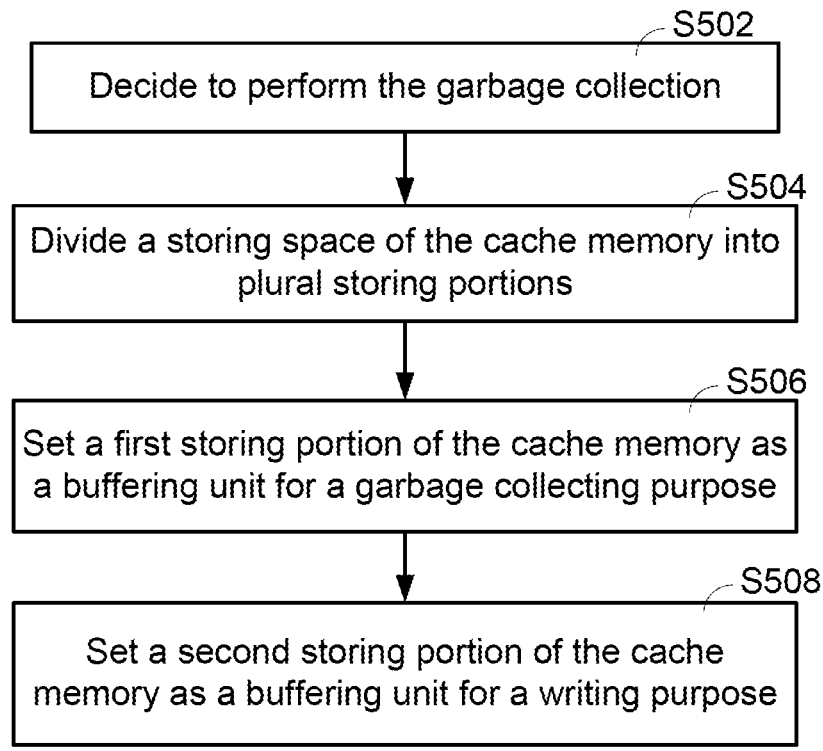
FIG. 5A is a flowchart illustrating a managing method for a cache memory of a solid state drive according to an embodiment of the present invention.
Figure 5B:
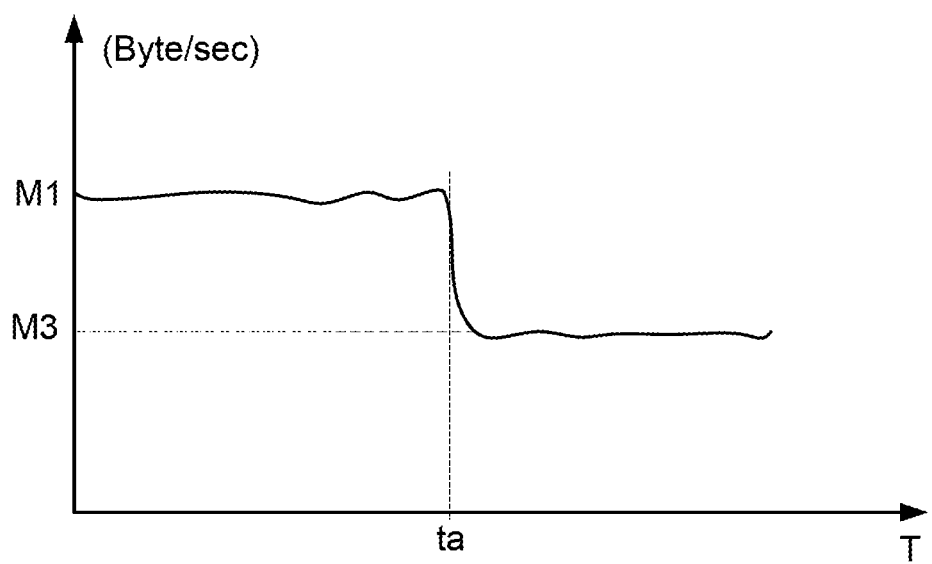
FIG. 5B schematically illustrates the variation of the writing speed of writing data into the solid state drive according to a write command while performing the garbage collection.

FIG. 5A is a flowchart illustrating a managing method for a cache memory of a solid state drive according to an embodiment of the present invention. FIG. 5B schematically illustrates the variation of the writing speed of writing data into the solid state drive according to a write command while performing the garbage collection. By using the managing method of the present invention, the performance of the solid state drive 210 can be more stable.

Please refer to FIG. 5A. When the controlling unit 201 of the solid state drive 210 decides to perform a garbage collection (Step S502), a storing space of the cache memory 203 is divided into plural storing portions (Step S504). Then, a first storing portion of the cache memory 203 is set as a buffering unit for a garbage collecting purpose (Step S506), and a second storing portion of the cache memory 203 is set as a buffering unit for a writing purpose (Step S508).

The above method can effectively manage the cache memory 203. When the controlling unit 201 of the solid state drive 210 performs the garbage collection, the first storing portion of the cache memory 203 is used for temporarily storing the moved data from the flash memory 205. When the write command from the host 212 is received by the controlling unit 201 of the solid state drive 210, the second storing portion of the cache memory 203 is used for temporarily storing the write data. Consequently, while the controlling unit 201 of the solid state drive 210 performs the garbage collection, the controlling unit 201 may temporarily store the write data into the second storing portion of the cache memory 203 and execute the write command.

Please refer to FIG. 5B. While the controlling unit 201 of the solid state drive 210 executes the write command, the cache memory 203 is used for temporarily storing the write data (i.e. for a writing purpose). Under this circumstance, the writing speed is substantially maintained at the highest speed M1.

At the time point ta, the number of free blocks in the flash memory 205 decreases to a threshold number, and thus the garbage collection is started by the controlling unit 201. Since the second storing portion of the cache memory 203 is set as the buffering unit for the writing purpose, the controlling unit 201 can still executes the write command. Under this circumstance, the writing speed decreases to M3.

According to the managing method of the present invention, the controlling unit 201 of the solid state drive 210 can still execute the write command from the host 212 during the process of performing the garbage collection. Consequently, the performance of the solid state drive 210 is still satisfied.

Alternatively, in the solid state drive 210, a third storing portion of the cache memory 203 may be set as a buffering unit for temporarily storing the read data (i.e. for a reading purpose). In other words, the controlling unit 201 of the solid state drive 210 can still execute the read command and the write command from the host 212 during the process of performing the garbage collection. Consequently, the performance of the solid state drive 210 is still satisfied.

Figure 6:
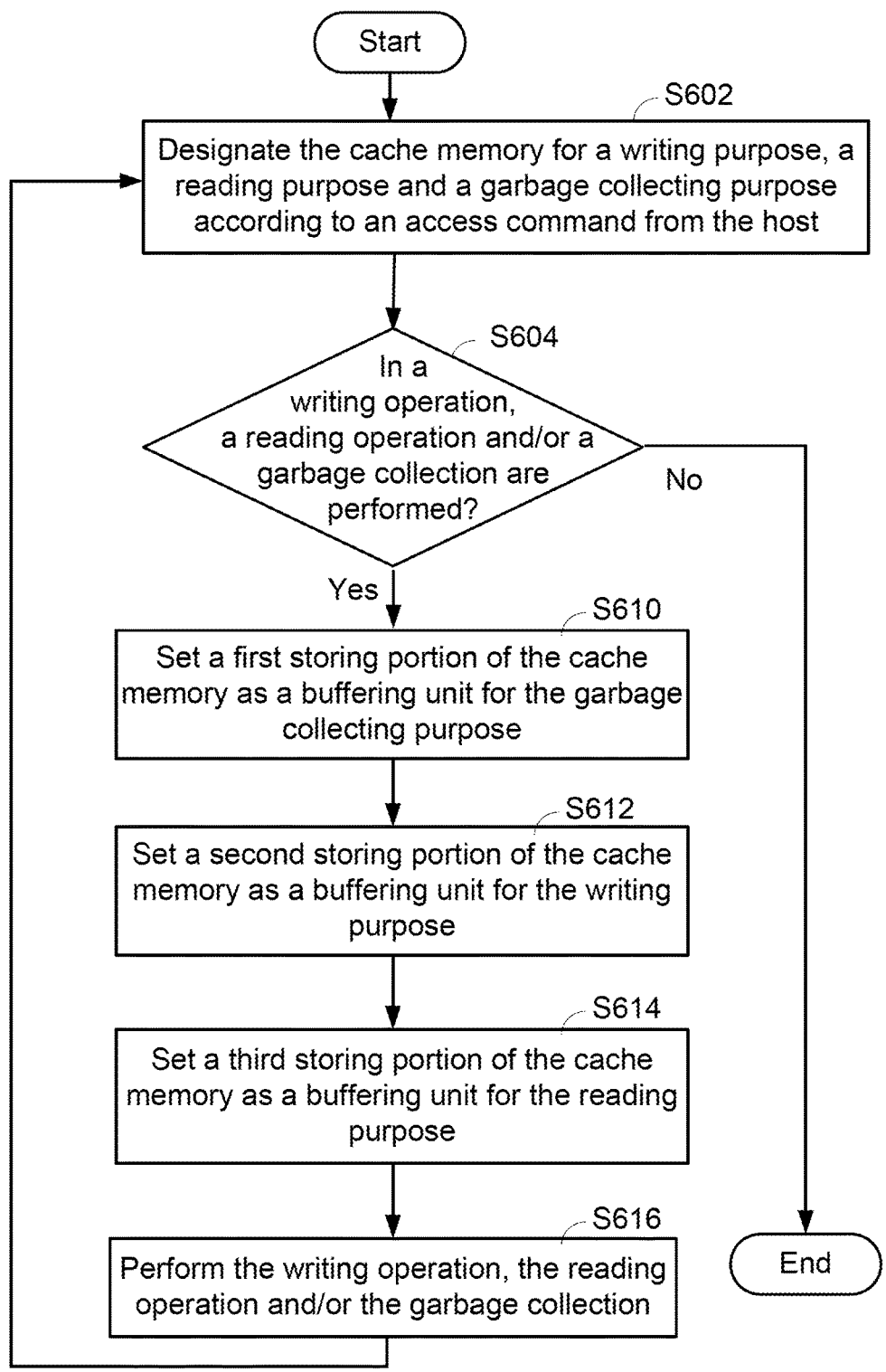
FIG. 6 is a flowchart illustrating a managing method for a cache memory of a solid state drive according to another embodiment of the present invention.

FIG. 6 is a flowchart illustrating a managing method for a cache memory of a solid state drive according to another embodiment of the present invention. Firstly, according to an access command from the host 212, the cache memory 203 is designated for a writing purpose, a reading purpose or a garbage collecting purpose (Step 602).

If the controlling unit 201 of the solid state drive 210 starts to perform a writing operation, a reading operation and/or a garbage collection (Step S604), a first storing portion of the cache memory 203 is set as a buffering unit for the garbage collecting purpose (Step S610), a second storing portion of the cache memory 203 is set as a buffering unit for the writing purpose (Step S612), and a third storing portion of the cache memory 203 is set as a buffering unit for the reading purpose (Step S614). Then, the writing operation, the reading operation and/or the garbage collection are performed (Step S616).

Then, the step S602 and the step S604 are repeatedly done until the condition of the step S604 is not satisfied. Meanwhile, the flowchart of the managing method is ended.

Figures 7, 8, 9, 10:
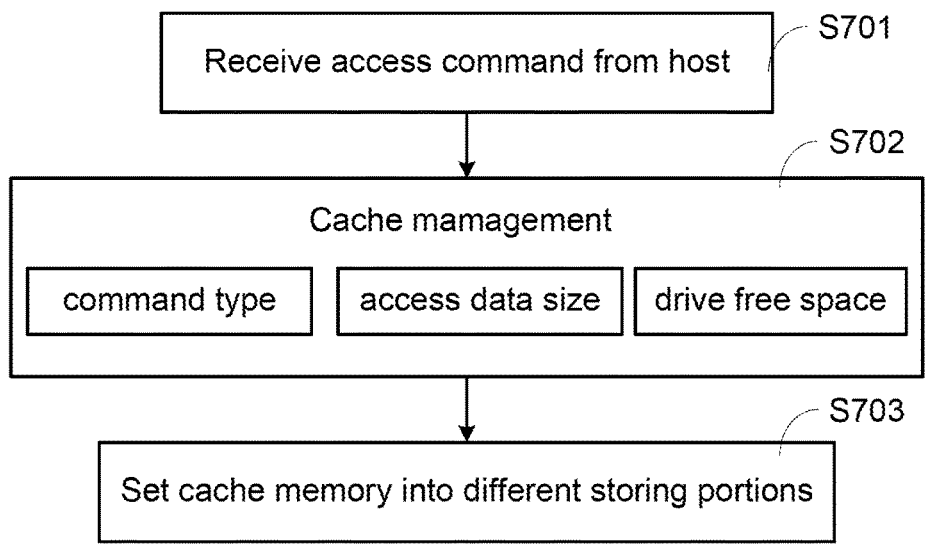
FIG. 7 is a flow chart illustrating a managing method for the cache memory.
FIG. 8 is a schematic diagram illustrating the storing portions of the cache memory according to a first embodiment.
FIG. 9 is a schematic diagram illustrating the storing portions of the cache memory according to a second embodiment.
FIG. 10 is a schematic diagram illustrating the storing portions of the cache memory according to a third embodiment.

FIG. 7 is a flow chart illustrating a managing method for the cache memory. Firstly, the controlling unit 201 receives the access command from the host 212 (Step S701). The controlling unit 201 further determines at least one of the command type of the access command, access data size of the access command and the free space of the solid state drive 210 (Step S702). According to at least one of the command type and access data size of the access command and the capacity of the free space in the solid state drive 210, the cache memory 203 is set to different storing portions (Step S703).

FIGS. 8-9 are schematic diagrams illustrating the cache memory according to different embodiments. In FIG. 8, when the access command from the host 212 is a sequential write command and the free space is lower than a first threshold, two storing portions (marked as "W") of the cache memory 203 are set as a buffering unit for the writing purpose while the rest storing portions (marked as "G") of the cache memory 203 are set as a buffering unit for the garbage collecting purpose. In FIG. 9, when the access command from the host 212 is a sequential write command and the free space is higher than the first threshold, the eight storing portions of the cache memory 203 are set as a buffering unit for the writing purpose while the rest storing portions of the cache memory 203 are set as a buffering unit for the garbage collecting purpose. In FIG. 9, the write data (access data size) for the sequential write command is larger than the write data (access data size) for the sequential write command in FIG. 8 and the free space of the solid state drive 210 in FIG. 9 is larger than the free space of the solid state drive 210 in FIG. 8. Besides the sequential write command, the access command from the host 212 can be a random write command or a read command.

FIG. 10 illustrates the cache memory according to another embodiment. In this embodiment, the access command from the host 212 further includes a read command and a write command (sequential write or random write) and the controlling unit 201 sets the cache memory 203 to different storing portions according to at least one of the command type, access data size of the command and the drive free space. In FIG. 10, two storing portions (marked as "R") of the cache memory 203 are set as a buffering unit for the reading purpose, six storing portions of the cache memory 203 are set as a buffering unit for the writing purpose and the rest storing portions are set as a buffering unit for the garbage collecting purpose.

In the embodiments shown in FIGS. 8-10, when the drive free space is lower than the first threshold, the controlling unit 201 sets more storing portions of the cache memory 203 to perform the garbage collection. So that the flash memory 205 have more space for storing the write data from the host 212. In addition, the controlling unit 201 sets the storing portions of the cache memory according to the command type of the access command and the access data size of the access command. Under different conditions of the command type, access data size and the drive free space, the storing portions of the cache memory are dynamically changed for different purposes.

From the above descriptions, the present invention provides a managing method for a cache memory of a solid state drive. According to the managing method of the present invention, the controlling unit 201 of the solid state drive 210 can still execute the access command from the host 212 during the process of performing the garbage collection. Consequently, the performance of the solid state drive 210 is still satisfied.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A managing method for a cache memory of a solid state drive, wherein the solid state drive comprises the cache memory, a flash memory and a controlling unit, wherein the cache memory and the flash memory are physically separate and distinct, and the managing method comprises steps of:

determining at least one of a command type of an access command from a host, an access data size of the access command and a drive free space of the flash memory;

dividing a storing space of the cache memory into plural storing portions according to at least one of the command type, the access data size and the drive free space of the flash memory when the controlling unit decides to perform a garbage collection;

setting a first storing portion of the cache memory as a buffering unit of the flash memory for a garbage collecting purpose; and setting a second storing portion of the cache memory as another buffering unit of the flash memory for a writing purpose wherein the first storing portion is larger than the second storing portion when the access command is a write command and the drive free space of the flash memory is lower than a first threshold.

2. The managing method as claimed in claim 1, further comprising steps of:

when the access command is the write command and the drive free space of the flash memory is higher than the first threshold, size of the first storing portion decreases and size of the second storing portion increases.

3. The managing method as claimed in claim 1, wherein when the access command is the write command, a write data of the write command is stored into the second storing portion of the cache memory.

4. The managing method as claimed in claim 1, wherein a moved data of the garbage collection from the flash memory is stored in the first storing portion of the cache memory.

5. The managing method as claimed in claim 1, further comprising a step of setting a third storing portion of the cache memory as still another buffering unit of the flash memory for a reading purpose, wherein when the access command is a read command, a read data of the read command is stored into the third storing portion of the cache memory.

6. A managing method for a cache memory of a solid state drive, wherein the solid state drive comprises the cache memory, a flash memory and a controlling unit wherein the cache memory and the flash memory are physically separate and distinct, and the managing method comprises steps of:

(a) designating the cache memory for a writing purpose or a reading purpose according to an access command before the controlling unit performs a garbage collection;

(b) setting a first storing portion of the cache memory as a buffering unit of the flash memory for a garbage collecting purpose and setting a second storing portion of the cache memory as another buffering unit of the flash memory for the writing purpose according to at least one of a command type of the access command from a host, an access data size of the access command and a drive free space of the flash memory when the controlling unit decides to perform the garbage collection, wherein the first storing portion is larger than the second storing portion when the drive free space of the flash memory is lower than a first threshold; and (c) repeatedly performing the step (a) after the garbage collection is completed by the controlling unit.

7. The managing method as claimed in claim 6, wherein the access command is a sequential write command, a random write command or a read command.

8. The managing method as claimed in claim 6, wherein the command type of the access command is a write command, wherein when the write command is received by the solid state drive, the solid state drive temporarily stores a write data into the second storing portion of the cache memory and executes the write command.

9. The managing method as claimed in claim 6, wherein a moved data of the garbage collection from the flash memory is temporarily stored in the first storing portion of the cache memory.

10. The managing method as claimed in claim 6, wherein the step (b) further comprises a step of setting a third storing portion of the cache memory as a still another buffering unit of the flash memory for a reading purpose, wherein the command type of the access command is a read command, wherein when the read command is received by the solid state drive, the solid state drive temporarily stores a read data into the third storing portion of the cache memory and executes the read command.

11. A solid state drive in communication with a host, the solid state drive comprising:
a flash memory;
a cache memory; and
a controlling unit in communication with the host and connected to the flash memory and the cache memory, wherein the controlling unit receives an access command from the host and determines at least one of a command type of the access command, an access data size of the access command and a drive free space of the flash memory;
wherein when the controlling unit decides to perform a garbage collection, a first storing portion of the cache memory wherein the cache memory and the flash memory are physically separate and distinct, is set as a buffering unit of the flash memory for a garbage collecting purpose, and a second storing portion of the cache memory is set as another buffering unit of the flash memory for a writing purpose according to at least one of the command type, the access data size and the drive free space of the flash memory, wherein the first storing portion is larger than the second storing portion when the drive free space of the flash memory is lower than a first threshold.

12. The solid state drive as claimed in claim 11, wherein the command type is a sequential write command, a random write command or a read command.

13. The solid state drive as claimed in claim 11, wherein if the access command is a write command, the controlling unit temporarily stores a write data into the second storing portion of the cache memory and executes the write command.

14. The solid state drive as claimed in claim 11, wherein a moved data of garbage collection from the flash memory is temporarily stored in the first storing portion of the cache memory.

15. The solid state drive as claimed in claim 11, wherein a third storing portion of the cache memory is further set as still another buffering unit of the flash memory for a reading purpose, wherein if the access command is a read command, the controlling unit temporarily stores a read data into the third storing portion of the cache memory and executes the read command.

16. The solid state drive as claimed in claim 15, wherein before the garbage collection is performed by the controlling unit, the cache memory is designated for the writing purpose or the reading purpose according to the access command.

* * * * *